(12) United States Patent
Baek

(10) Patent No.: US 7,256,855 B2
(45) Date of Patent: Aug. 14, 2007

(54) LIQUID CRYSTAL DISPLAY DEVICE

(75) Inventor: Heum-Il Baek, Seoul (KR)

(73) Assignee: LG.Philips LCD Co., Ltd., Seoul (KR)

( * ) Notice: Subject to any disclaimer, the term of this patent is extended or adjusted under 35 U.S.C. 154(b) by 39 days.

(21) Appl. No.: 10/876,726

(22) Filed: Jun. 28, 2004

(65) Prior Publication Data
US 2005/0140906 A1 Jun. 30, 2005

(30) Foreign Application Priority Data
Dec. 26, 2003 (KR) ............... 10-2003-0097884

(51) Int. Cl.
*G02F 1/1343* (2006.01)
(52) U.S. Cl. ............... 349/144; 349/146
(58) Field of Classification Search ........... 349/106, 349/108, 109, 143, 144, 146; 359/242, 267; 313/517, 519, 521
See application file for complete search history.

(56) References Cited

U.S. PATENT DOCUMENTS

| 4,892,391 | A | * | 1/1990 | Stewart et al. | 349/143 |
|---|---|---|---|---|---|
| 5,642,176 | A | * | 6/1997 | Abukawa et al. | 349/106 |
| 5,757,452 | A | * | 5/1998 | Masaki et al. | 349/110 |
| 5,777,707 | A | * | 7/1998 | Masaki et al. | 349/110 |
| 5,899,550 | A | * | 5/1999 | Masaki | 349/109 |
| 6,888,604 | B2 | * | 5/2005 | Rho et al. | 349/146 |
| 6,989,876 | B2 | * | 1/2006 | Song et al. | 349/109 |
| 2002/0093027 | A1 | * | 7/2002 | Zhong et al. | 257/98 |
| 2003/0193629 | A1 | * | 10/2003 | Yamaguchi | 349/61 |
| 2004/0046725 | A1 | * | 3/2004 | Lee | 345/88 |
| 2004/0051724 | A1 | * | 3/2004 | Elliott et al. | 345/694 |
| 2004/0227890 | A1 | * | 11/2004 | Chung et al. | 349/141 |

FOREIGN PATENT DOCUMENTS

| JP | 60-061724 | * | 4/1985 |
|---|---|---|---|
| JP | 4-355722 | | 12/1992 |
| KR | 2004-0023241 | | 3/2004 |

* cited by examiner

*Primary Examiner*—Toan Ton
(74) *Attorney, Agent, or Firm*—Morgan, Lewis & Bockius LLP

(57) ABSTRACT

A liquid crystal display device includes a red sub-pixel having a first area, a green sub-pixel having a second area, a blue sub-pixel having a third area, a white sub-pixel having a fourth area, and a backlight supplying a light to the red, green, blue, and white sub-pixels. The fourth area is smaller than the third area.

12 Claims, 4 Drawing Sheets

LIQUID CRYSTAL DISPLAY DEVICE

The present invention claims the benefit of Korean Patent Application No. 2003-97884, filed in Korea on Dec. 26, 2003, which is hereby incorporated by reference.

BACKGROUND OF THE INVENTION

1. Field of the Invention

The present invention relates to a liquid crystal display device and a display device, and more particularly, to an RGBW type liquid crystal display device having red, green, blue, white sub-pixels.

2. Discussion of the Related Art

In the past, a cathode ray tube (CRT) or a television monitor has been used as a display device. More recently, a flat panel display device, such as a liquid crystal display device (LCD), a plasma display panel (PDP), a field emission display, and an electro-luminescence display (ELD), has been used as a display device. Of those devices, a liquid crystal device is used because it is thin, lightweight, and consumes low power. A liquid crystal display device displays video information with a plurality of pixels arranged in a matrix structure. In general, a pixel has red, green, and blue sub-pixels.

FIG. 1 is a view of an RGB stripe type display device according to related art. In FIG. 1, gate and data lines "GL" and "DL" cross each other to define a sub-pixel region. Red, green, blue sub-pixels "R", "G", and "B" are arranged along a row, and constitute a pixel.

In general, the RGB stripe type display device has been used. In addition to an RGB stripe type, an RGB delta type and an RGB mosaic type may be adapted to a liquid crystal display device. Nowadays, an RGBW type liquid crystal display device having R, G, and B sub-pixels and further a white sub-pixel W is being used.

FIG. 2 is a view of an RGBW quad-type display device having red, green, blue, and white sub-pixels according to related art. In FIG. 2, red, green, blue, and white sub-pixels "R", "G", "B", and "W" constitute a pixel "P." A plurality of pixels "P" are arranged in a matrix structure. The RGBW quad-type liquid crystal display device has a higher white brightness than the RGB stripe type liquid crystal display device because of the additional white sub-pixel "W" in the RGBW quad-type liquid crystal display.

FIG. 3 depicts spectrum of the transmittances of the related art RGB type and RGBW type liquid display devices, respectively. In FIG. 3, light of wavelength higher than 500 nm has higher transmittance than light of wavelength lower than 500 nm. Accordingly, when RGB and RGBW type liquid crystal display devices operate at the same backlight color temperature, the RGBW type liquid crystal display device has a yellow-shifted white color coordinate in CIE (Commission Internationale de l'Eclairage) chromatic diagram.

TABLE 1 displays variations in color coordinates of the RGB and RGBW types liquid crystal display devices corresponding to various backlight color temperatures according to the related art. In TABLE 1, when RGB and RGBW types liquid crystal display devices operate with same backlight color temperature, the RGBW type liquid crystal display device has higher white color coordinate values than the RGB liquid crystal display device.

TABLE 1

| Temperature of a backlight | | 6961 K | | 7520 K | | 8293 K | |
|---|---|---|---|---|---|---|---|
| Color coordinate of a back light | | x | y | x | y | x | y |
| | | 0.310 | 0.298 | 0.306 | 0.291 | 0.298 | 0.286 |
| RGB type | White | 0.316 | 0.328 | 0.310 | 0.321 | 0.303 | 0.317 |
| | Red | 0.610 | 0.469 | 0.609 | 0.467 | 0.604 | 0.465 |
| | Green | 0.306 | 0.458 | 0.302 | 0.455 | 0.303 | 0.455 |
| | Blue | 0.147 | 0.119 | 0.146 | 0.116 | 0.146 | 0.115 |
| RGBW type | White | 0.325 | 0.332 | 0.319 | 0.325 | 0.313 | 0.321 |
| | Red | 0.605 | 0.466 | 0.604 | 0.464 | 0.598 | 0.461 |
| | Green | 0.306 | 0.456 | 0.302 | 0.454 | 0.303 | 0.453 |
| | Blue | 0.149 | 0.122 | 0.148 | 0.118 | 0.148 | 0.117 |

The related art RGB and RGBW types liquid crystal display devices suffer from the following problem. For the white color coordinate value of the RGBW liquid crystal display device to match the white color coordinate value of the RGB liquid crystal display device, the backlight of the RGBW liquid crystal display device should have a higher color temperature than the backlight of the RGB liquid crystal display device. For example, referring to TABLE 1, when a backlight of the RGB liquid crystal display device has color temperature of 6919K, and a backlight of the RGBW liquid crystal display device has color temperature of 8293K, the RGBW liquid crystal display device has substantially same white color coordinate value as the RGB liquid crystal display device.

SUMMARY OF THE INVENTION

Accordingly, the present invention is directed to a liquid crystal display device that substantially obviates one or more of problems due to limitations and disadvantages of the related art.

An object of the present invention is to provide a liquid crystal display device that generates the same white color coordinate as an RGB type liquid crystal display device without an increase in the color temperature of a backlight.

Another object of the present invention is to provide a display device that generates the same white color coordinate as an RGB type liquid crystal display device without an increase in the color temperature of a backlight.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the liquid crystal display device includes a red sub-pixel having a first area, a green sub-pixel having a second area, a blue sub-pixel having a third area, a white sub-pixel having a fourth area, and a backlight supplying a light to the red, green, blue, and white sub-pixels. The fourth area is smaller than the third area.

In another aspect, the display device includes a red sub-pixel having a first area, a green sub-pixel having a second area, a blue sub-pixel having a third area, a white sub-pixel having a fourth area; and a light source supplying a light to the red, green, blue, and white sub-pixels. The fourth area is smaller than the third area.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the illustrated embodiments of the present invention, which are illustrated in the accompanying drawings.

Figure 1:
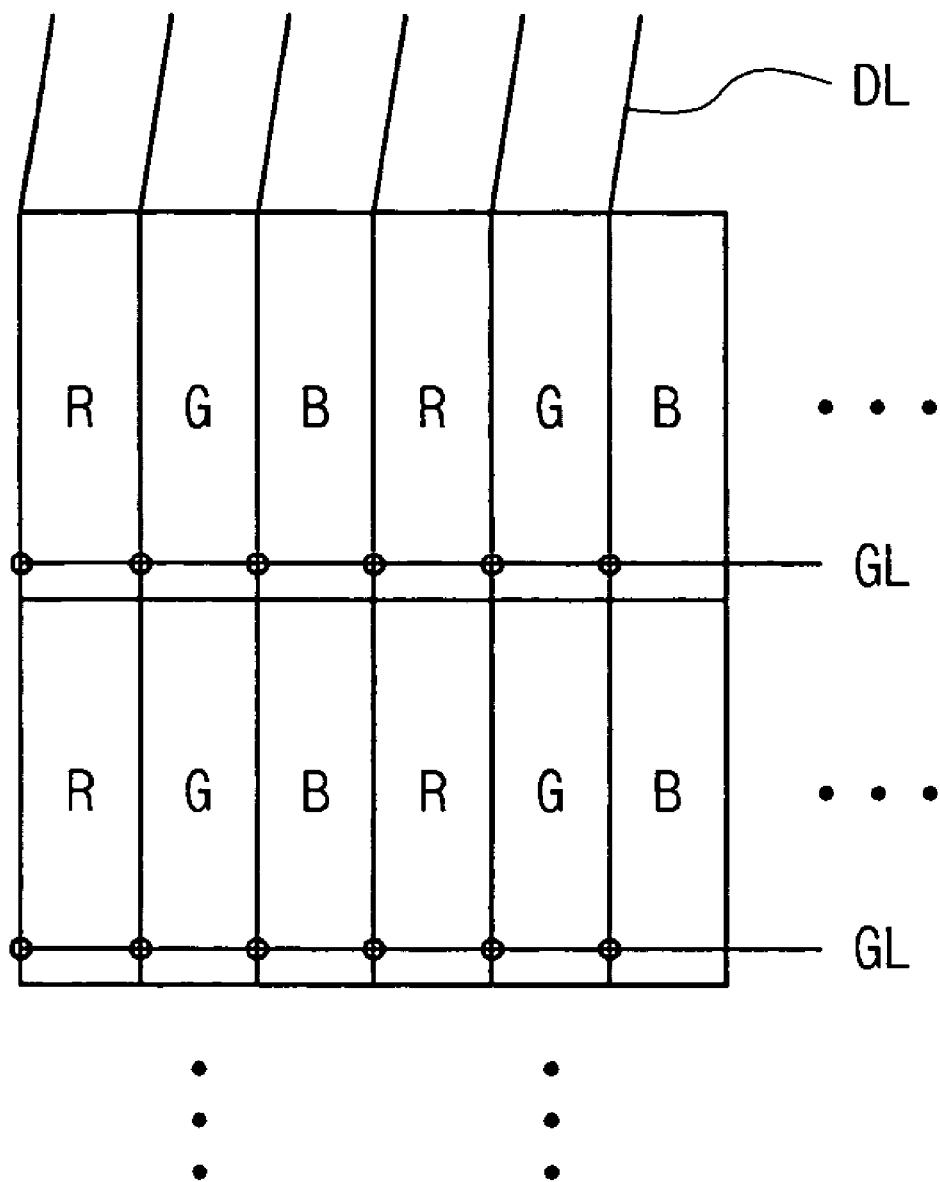
FIG. 1 is a view of an RGB stripe type display device according to related art.
Figure 2:
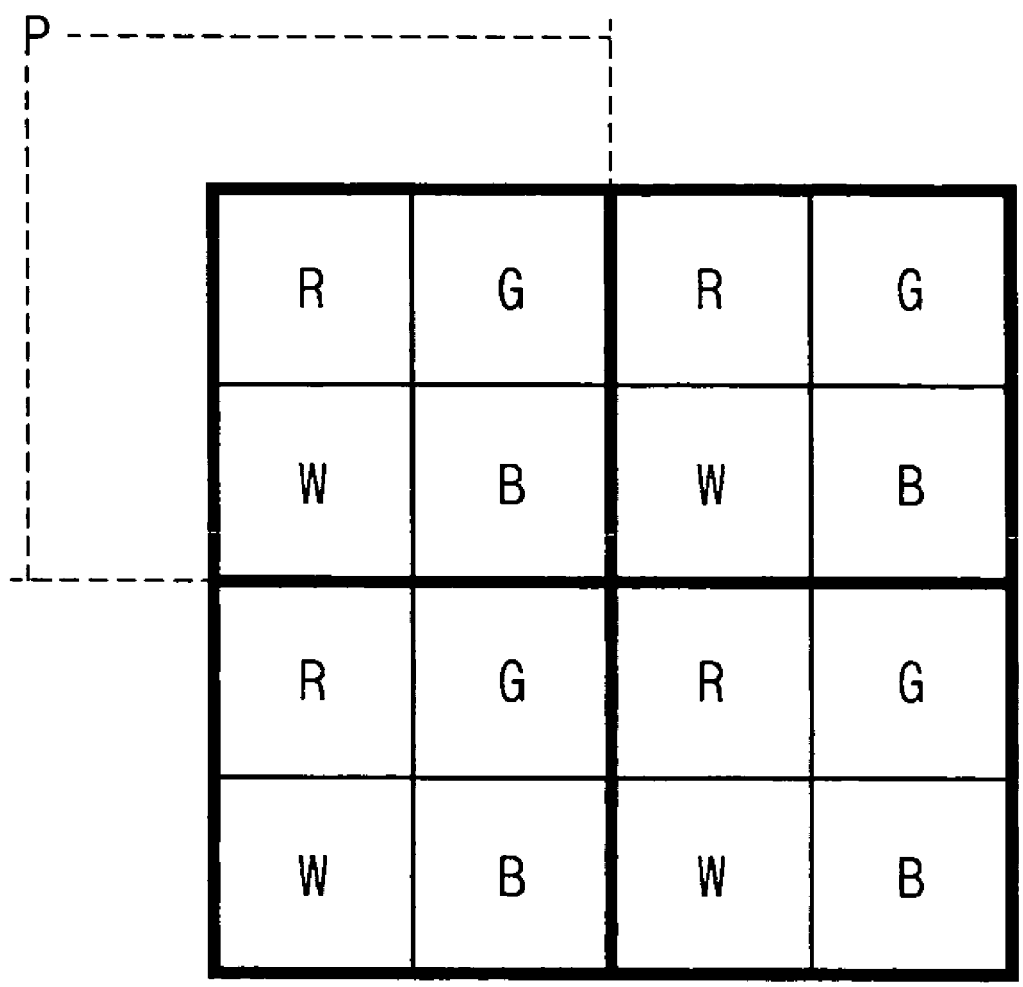
FIG. 2 is a view of an RGBW quad-type display device having red, green, blue, and white sub-pixels according to related art.
Figure 3:
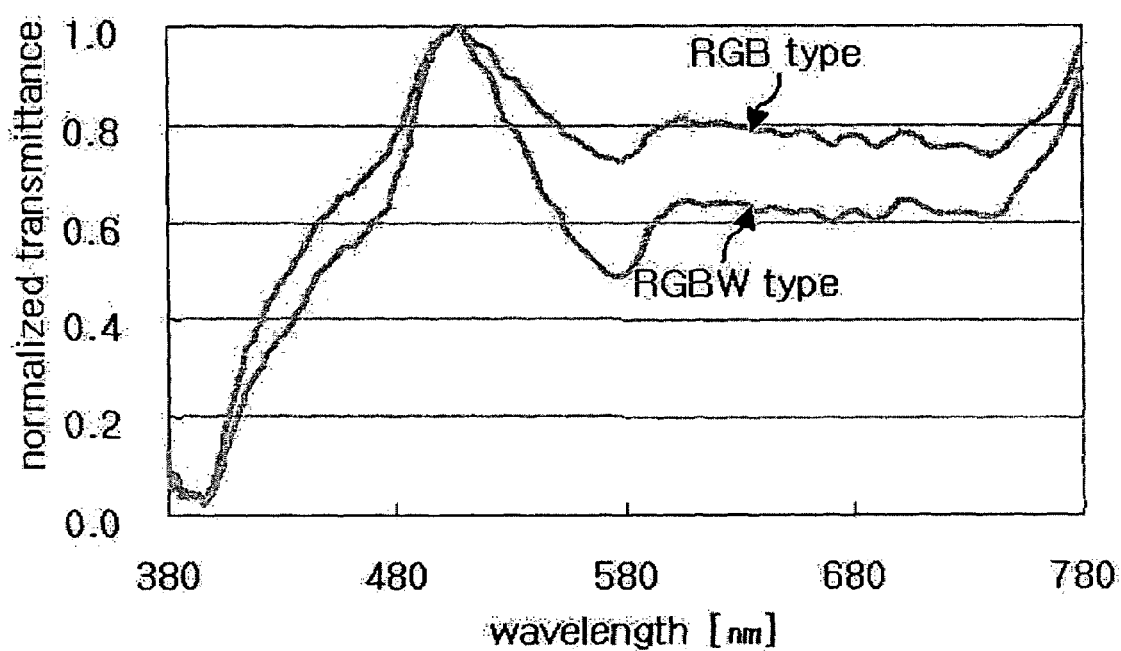
FIG. 3 depicts spectrum of the transmittances of the related art RGB type and RGBW type liquid display devices, respectively.
Figure 4:
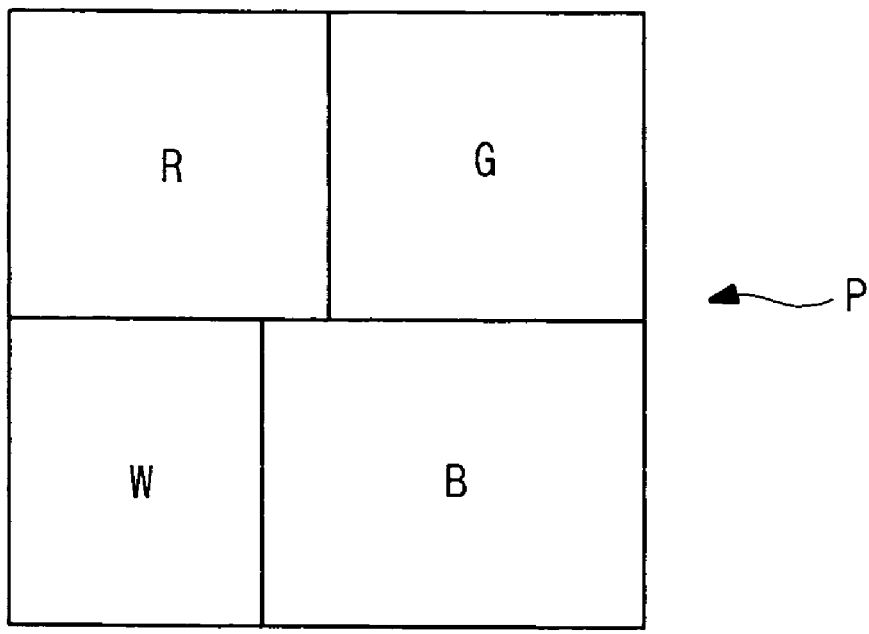
FIG. 4 is a view of an exemplary RGBW quad type liquid crystal display device according to an embodiment of the present invention.

FIG. 4 is a view of an exemplary RGBW quad type liquid crystal display device according to an embodiment of the present invention. Referring to FIG. 4, a pixel "P" has red, green, blue, and white sub-pixels "R", "G", "B", and "W" displaying red, green, blue, and white color, respectively. The sub-pixels form two rows and two columns of the pixel "P." An RGBW quad type liquid crystal display device has a plurality of pixels arranged in a matrix type.

Although not shown in FIG. 4, each of red, green, blue, and white sub-pixels "R", "G", "B", and "W" has a thin film transistor, a gate line and a data line connected with the thin film transistor disposed adjacent to crossings of the gate line and the data line. Since the green and white sub-pixels are brighter than the red and blue sub-pixels, the green and white sub-pixels "G" and "W" may be disposed diagonally with respect to each other to display a more uniform color brightness.

The white sub-pixel "W" has a smaller area than the blue sub-pixel "B." The red sub-pixel "R" has substantially the same area as the green sub-pixel "G." Each of red and green sub-pixels "R" and "G" has a smaller area than the blue sub-pixel "B", and has larger area than the white sub-pixel "W." The respective areas of the red, green, blue, and white sub-pixels satisfy the following relation: B>R=G>W.

TABLE 2 shows variations in color coordinates of the RGBW type liquid crystal display devices corresponding to various backlight color temperatures according to embodiments of the present invention when the relative ratio of the areas of red, green, blue, and white sub-pixels is about R:G:B:W=1:1:1.1:0.9. In TABLE 2, when the RGBW type liquid crystal display device has a backlight color temperature of about 7520 K, the RGBW type liquid crystal display device has substantially the same white color coordinate values as the RGB liquid crystal display device operating with a backlight color temperature of about 6961 K. Moreover, the RGBW type liquid crystal display device operating with a backlight color temperature lower than that of the related art has substantially the same white color coordinate values as the RGB liquid crystal display device at a backlight color temperature of about 6961 K.

TABLE 2

| Temperature of a backlight | | 6961 K | | 7520 K | | 8293 K | |
|---|---|---|---|---|---|---|---|
| Color coordinate of a back light | | x | y | x | y | x | y |
| | | 0.310 | 0.298 | 0.306 | 0.291 | 0.298 | 0.286 |
| RGB type | White | 0.316 | 0.328 | 0.310 | 0.321 | 0.303 | 0.317 |
| | Red | 0.610 | 0.469 | 0.609 | 0.467 | 0.604 | 0.465 |
| | Green | 0.306 | 0.458 | 0.302 | 0.455 | 0.303 | 0.455 |
| | Blue | 0.147 | 0.119 | 0.146 | 0.116 | 0.146 | 0.115 |
| RGBW type | White | 0.321 | 0.331 | 0.315 | 0.323 | 0.309 | 0.321 |
| | Red | 0.605 | 0.345 | 0.604 | 0.342 | 0.598 | 0.344 |
| | Green | 0.306 | 0.582 | 0.302 | 0.580 | 0.303 | 0.578 |
| | Blue | 0.148 | 0.117 | 0.148 | 0.114 | 0.147 | 0.112 |

TABLE 3 shows variations in color coordinates of the RGBW type liquid crystal display devices corresponding to various backlight color temperatures according to embodiments of the present invention when the relative ratio of the areas of red, green, blue, and white sub-pixels is about R:G:B:W=1:1:1.2:0.8. In TABLE 3, the RGBW type liquid crystal display device operating with a backlight color temperature of about 6961 K has substantially same white color coordinate value as the RGB liquid crystal display device operating with a backlight color temperature of about 6961 K. Accordingly, in embodiments of the present invention, the RGBW type liquid crystal display device operating with a backlight color temperature lower than the related art has substantially the same white color coordinate value as the RGB liquid crystal display device operating with a backlight color temperature of about 6961 K.

TABLE 3

| Temperature of a backlight | | 6961 K | | 7520 K | | 8293 K | |
|---|---|---|---|---|---|---|---|
| Color coordinate of a back light | | x | y | x | y | x | y |
| | | 0.310 | 0.298 | 0.306 | 0.291 | 0.298 | 0.286 |
| RGB type | White | 0.316 | 0.328 | 0.310 | 0.321 | 0.303 | 0.317 |
| | Red | 0.610 | 0.469 | 0.609 | 0.467 | 0.604 | 0.465 |
| | Green | 0.306 | 0.458 | 0.302 | 0.455 | 0.303 | 0.455 |
| | Blue | 0.147 | 0.119 | 0.146 | 0.116 | 0.146 | 0.115 |
| RGBW type | White | 0.317 | 0.327 | 0.310 | 0.318 | 0.304 | 0.316 |
| | Red | 0.606 | 0.344 | 0.605 | 0.342 | 0.599 | 0.344 |
| | Green | 0.306 | 0.582 | 0.302 | 0.580 | 0.303 | 0.578 |
| | Blue | 0.148 | 0.117 | 0.147 | 0.113 | 0.147 | 0.112 |

Figure 5:
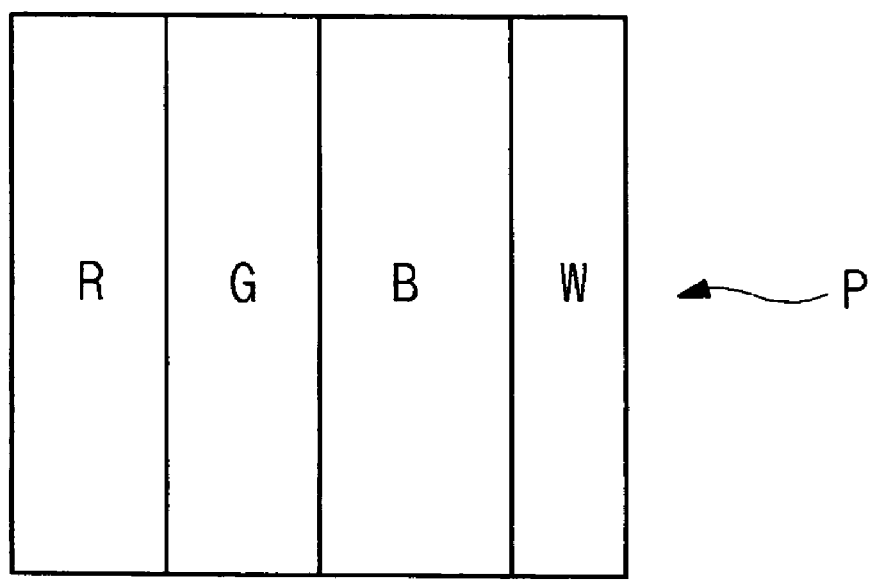
FIG. 5 is a view of an exemplary RGBW stripe type liquid crystal display device according to an embodiment of the present invention.

Although the above-mentioned embodiments of the present invention are directed to an exemplary RGBW quad liquid crystal display device as depicted in FIG. 4, the present invention is applicable to other types of RGBW type liquid crystal display devices including the exemplary RGBW stripe type liquid crystal device depicted in FIG. 5. In the RGBW stripe type liquid crystal device, the red, green, blue, and white sub-pixels are disposed along a row within the pixel "P." Moreover, the present invention is applicable to a non-luminous display device having a light source, such as a backlight.

It will be apparent to those skilled in the art that various modifications and variations can be made in embodiments the present invention without departing from the spirit or scope of the invention. Thus, it is intended that the present invention cover the modifications and variations of this invention provided they come within the scope of the appended claims and their equivalents.

What is claimed is:

1. A liquid crystal display device, comprising:
   a red sub-pixel having a first area;
   a green sub-pixel having a second area;
   a blue sub-pixel having a third area;
   a white sub-pixel having a fourth area, which is smaller than the third area; and
   a backlight supplying a light to the red, green, blue, and white sub-pixels,
   wherein the first and third areas share a common linear boundary and the second and fourth areas do not share a common linear boundary.

2. The liquid crystal display device according to claim 1, wherein a ratio of the third area to the fourth area is about 1:(0.9/1.1)~(0.8/1.2).

3. The liquid crystal display device according to claim 1, wherein the third area is larger than the first area and the second area, respectively, and the fourth area is smaller than the first area and the second area, respectively.

4. The liquid crystal display device according to claim 3, wherein the first area is substantially same as the second area.

5. The liquid crystal display device according to claim 1, wherein red, green, blue and white sub-pixels are disposed to form a quad arrangement.

6. The liquid crystal display device according to claim 5, wherein the green sub-pixel and the white sub-pixel are disposed diagonally with respect to each other.

7. The liquid crystal display device according to claim 2, wherein the backlight has color temperature of about 6961K to 7520 K.

8. A display device, comprising:
   a red sub-pixel having a first area;
   a green sub-pixel having a second area;
   a blue sub-pixel having a third area;
   a white sub-pixel having a fourth area, which is smaller than the third area; and
   a light source supplying a light to the red, green, blue, and white sub-pixels,
   wherein the first and third areas share a common linear boundary and the second and fourth areas do not share a common linear boundary.

9. The display device according to claim 8, wherein the third area is larger than the first area and the second area, respectively, and the fourth area is smaller than the first area and the second area, respectively.

10. The display device according to claim 9, wherein the first area is substantially same as the second area.

11. The display device according to claim 8, wherein red, green, blue and white sub-pixels are disposed to form a quad arrangement.

12. The display device according to claim 11, wherein the green sub-pixel and the white sub-pixel are disposed diagonally with respect to each other.

* * * * *